UNITED STATES PATENT OFFICE.

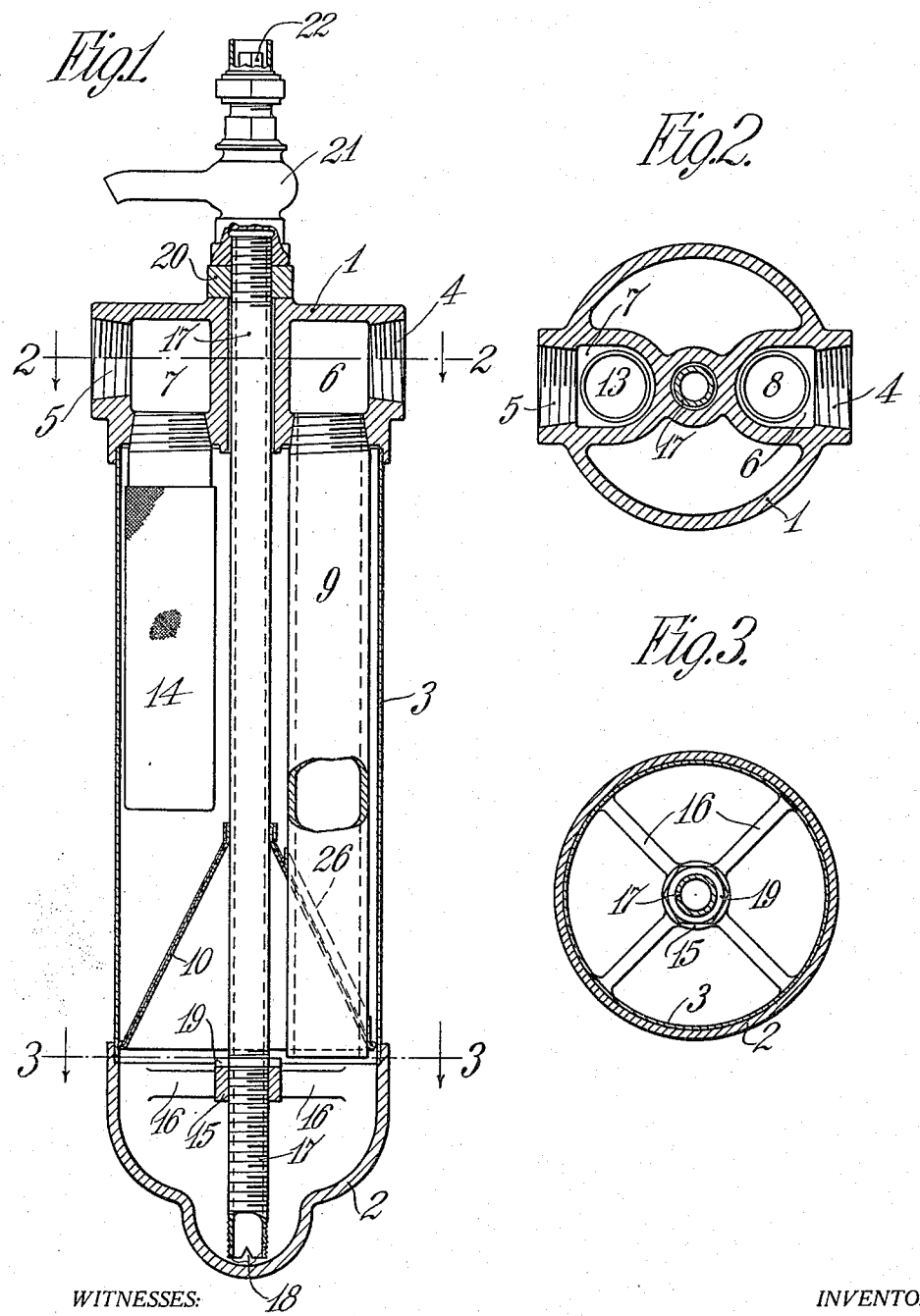

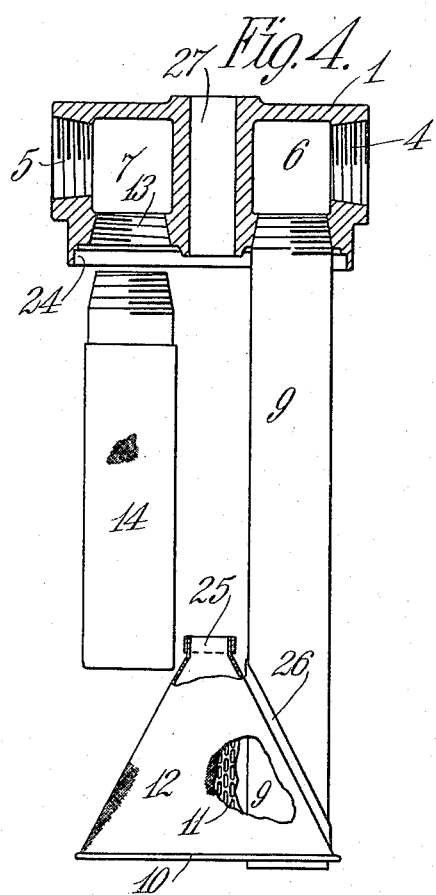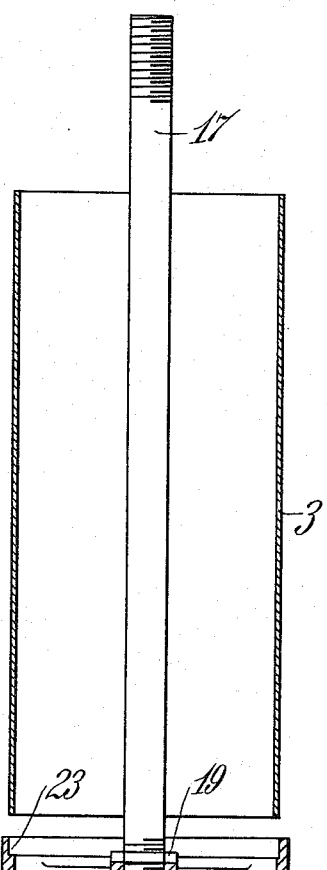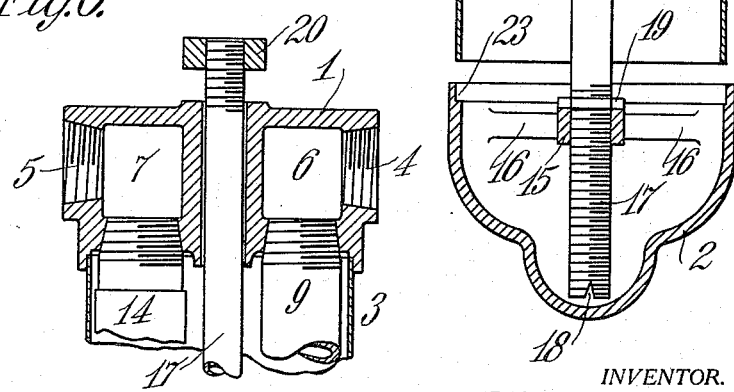

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

FILTERING APPARATUS.

1,156,592.  Specification of Letters Patent.  Patented Oct. 12, 1915.

Application filed April 17, 1915. Serial No. 21,998.

*To all whom it may concern:*

Be it known that I, JOHN B. DAVIS, a citizen of the United States of America, residing in the city of Springfield, county of Hampden, and State of Massachusetts, have invented certain new and useful Improvements in Filtering Apparatus, of which the following is a specification.

This invention relates to filtering apparatus and in particular to apparatus which is adapted for the filtration of gasolene and like liquids.

An object of this invention is to provide an efficient and improved apparatus for the filtration of gasolene, which is adapted to be conveniently interposed in a pipe line between supply and delivery apparatus.

Another object is to provide apparatus of the class described, which is arranged for quick and convenient cleaning.

A further object is to provide a filtering apparatus suitable for economical manufacture, the parts of which are few in number, simple in structure and arranged for convenient and rapid assembly.

With these objects in view, one preferred form of my invention, for illustrative purposes, is shown in the accompanying drawings, in which:

Figure 1 is a sectional elevation of the assembled filter; Fig. 2 is a sectional plan view taken on the line 2—2 of Fig. 1 and looking in the direction of the arrows; Fig. 3 is a sectional plan view taken on the line 3—3 of Fig. 1 and looking in the direction of the arrows; Figs. 4, 5, and 6 are sectional views illustrating three steps in the assembly of the filter.

Referring to the drawings in detail and particularly in Figs. 1 to 3 inclusive, 1 and 2 represent upper and lower cap members of circular cross sectional shape, which are interconnected by a thin cylindrical shell 3. The parts 1, 2, and 3 comprise an inclosing casing for the filtering apparatus to be described.

The upper cap member 1 is provided on opposite sides with tapped holes 4 and 5 which lead to chambers 6 and 7, suitably cored in the cap as clearly shown in Fig. 2. Formed in the under side of the cap 1 and leading to the chambers 6 and 7 are other tapped holes 8 and 13, respectively. Threaded into the opening 13 and depending vertically therefrom is a filter 14 formed of any suitable material. Threaded into the opening 8 is a pipe 9, which extends vertically downward to the top of the lower cap 2 and communicates therewith. A filter 10, of substantially conical shape is supported on the pipe 9 by means of a flange 26 which may be secured to the pipe in any suitable manner, such as soldering for example. The base of the conical filter is equal in diameter to the inside of the shell 3 so that it just fills the latter and forms a porous partition therein. This filter may be constructed in any of the well known ways and of any suitable material. For the purposes of illustration, however, it has been shown as made up of a shell 11 of perforated metal (see Fig. 4) which supports a covering 12 of filtering material.

Near the apex of the cone filter 10 is a collar with an opening 25, which is centrally arranged relative to the shell 3. The lower cap member 2 is a hollow casting which has a central boss 15 suitably supported by webs 16 from the periphery of the casting, as clearly shown in Fig. 3. The boss 15 has a threaded hole therein to receive the lower threaded end of a tube 17. The latter extends downwardly close to the lower portion of the cap 2 and has V-shaped notches 18 therein. A nut 19 on the tube 17 is clamped against the upper face of the boss 15 and serves to position the tube relative to the bottom of cap 2. This tube 17 extends upwardly through the opening 25 in the filter 10 and passes through a centrally arranged smooth bore 27 in the cap member 1. The upper end of the tube 17 is also threaded to receive a nut 20, which is arranged to clamp the shell 3 between the caps 1 and 2. A valve 21, having a squared operating shank 22 to receive a socket wrench, is applied to the top of the tube 17.

It will be seen that the structure just described is composed of few parts, each of which is of the simplest character and designed to require little or no finishing. No special operations are necessary to form any of the parts and practically the only finishing operations necessary in the manufacture of the filter may be performed with a tap and die. The cap 1 is a casting, which is cored to form all the openings therein, and requires only the tapping of the openings 4, 5, 8 and 13. Similarly the lower cap 2 is cast and requires only the tapping of the central opening in boss 15. The shell 3 and member 17 are constructed of standard tubing cut to length and the tube 17 only requires threading. The filters 10 and 14 are also simple in construction.

Aside from the simplicity of parts, which makes for economical manufacture, the device is arranged for quick and convenient assembly. Referring to Figs. 4 to 6 inclusive, which show successive stages in the assembling of the parts, the filter 10 is first attached and properly positioned on the pipe 9. The latter is then threaded into the opening 13 of the cap 1 and turned until the opening 25 in the filter 10 is alined with the opening 27 in the cap. The filter 14 is next threaded into the opening 13 of cap 1, which completes the assembly of one group of the parts. The assembly of the next group is illustrated in Fig. 5. The check nut 19 is first turned onto the lower portion of the tube 17 and the latter is then turned into the threaded opening in the boss 15 until the bottom of the tube occupies the position shown in Fig. 5. The nut 19 is then tightened against the upper face of the boss 15 to secure the tube in position. The shell 3 is next dropped over the tube 17 and into a circumferential flanged recess 23. The assembled groups shown in Figs. 4 and 5 are then placed together, which is a simple operation. The tube 17 is passed through the central hole 25 of the cone filter 10 and then through the hole 27 of cap 1. The casing 3 in its upward movement is guided by the base of the cone filter 10 and the upper end of the shell 3 finally rests in a suitable recess 24 in the under side of the cap 1. This stage in the assembly of the parts is shown in Fig. 6 and to complete the work and secure the assembled groups together, the nut 20 is simply turned down against the cap 1, whereby the shell 3 is held between the caps 1 and 2. Finally the valve 21 is applied to the top portion of tube 17, which extends beyond the nut 20.

In operation the chamber 6 is connected by suitable piping to a supply tank and interposed in this piping is a pump. The chamber 7 is also connected by piping to delivery apparatus. The gasolene to be filtered is forced by the pump into the chamber 6, down the pipe 9 and into the cap 2. The pressure of the pump then forces the liquid through the filter 10 into the interior of the shell 3 and finally through the filter 14 to the delivery piping. The filter 10 is adapted primarily to remove all water from the gasolene and the screen 12 is formed of suitable material to effect this purpose. All water in the gasolene, therefore, remains in the cap 2 and may be removel therefrom, when desired, in the following manner. The valve in the delivery piping connected to the outlet 5 is closed and the valve 21 is opened. The pump is then started and the liquid in the cap 2 is forced upwardly through the tube 17 and out through the valve 21. The notches 18 are arranged to permit a free flow up the tube even should the bottom of the latter abut the cap 2. It will be noted that the tube 17 serves the double purposes of a tie rod and blow-off tube.

Thus I have provided an efficient filter for gasolene and like liquids, which is simple in construction, easy to assemble, and comparatively cheap to manufacture. It is obvious that various changes may be made in the specific structure shown without departing from the scope of my invention which is defined in the appended claims.

What I claim is:

1. A filter comprising in combination, a casing formed with an inlet and outlet at one end thereof, a filter at the other end of said casing forming a partition therein, a connection from said inlet extending through and below said filter, said connection arranged to support the filter, and a second filter connected to said outlet and arranged above said first named filter.

2. A filter comprising in combination, a casing having an inlet and outlet at one end thereof, a filter within said casing at the other end thereof arranged to partition said casing, a connection from said inlet extending through and below said filter, a second filter above said first named filter connected with said outlet, a tube extending from below said first named filter through the opposite end of said casing and a valve on the end of said tube.

3. A filter comprising in combination, a casing having inlet and outlet passages, a pipe connected to said inlet passage, a filter supported on said pipe and arranged to partition said casing, said pipe extending entirely through said filter, a second filter connected to said outlet passage and arranged above said first named filter, a tube extending from below said first named filter near one end of said casing through the opposite end thereof, and a valve on the end of the tube.

4. A filter comprising a casing, a cap member at each end of said casing, an inlet and outlet passage formed in one of said cap members, a pipe from said inlet passage within said casing, a filter supported on said pipe and forming a partition wall within said casing, said pipe extending through and below said filter, a second filter connected to said outlet passage, and arranged above said first named filter, a tube secured to the other cap member and extending from a position below said filter near one end of said casing to and without the other end of said casing and a valve on the end of said tube, said tube arranged to clamp said casing between said cap members.

JOHN B. DAVIS.

Copies of this patent may be obtained for five cents each, by addressing the "Commissioner of Patents, Washington, D. C."